US010997703B1

United States Patent
Khalatian

(10) Patent No.: US 10,997,703 B1
(45) Date of Patent: May 4, 2021

(54) METHODS AND SYSTEMS FOR AUTOMATED ATTRACTIVENESS PREDICTION

(71) Applicant: Igor Khalatian, Tuxedo, NY (US)

(72) Inventor: Igor Khalatian, Tuxedo, NY (US)

( * ) Notice: Subject to any disclaimer, the term of this patent is extended or adjusted under 35 U.S.C. 154(b) by 76 days.

(21) Appl. No.: 16/386,330

(22) Filed: Apr. 17, 2019

Related U.S. Application Data

(60) Provisional application No. 62/661,960, filed on Apr. 24, 2018.

(51) Int. Cl.
| | | |
|---|---|---|
| *G06T 7/00* | (2017.01) | |
| *G06K 9/00* | (2006.01) | |
| *G06Q 50/00* | (2012.01) | |
| *G06N 20/00* | (2019.01) | |

(52) U.S. Cl.
CPC ........ *G06T 7/0002* (2013.01); *G06K 9/00268* (2013.01); *G06K 9/00288* (2013.01); *G06N 20/00* (2019.01); *G06Q 50/01* (2013.01); *G06T 2207/20081* (2013.01); *G06T 2207/30201* (2013.01)

(58) Field of Classification Search
None
See application file for complete search history.

(56) References Cited

U.S. PATENT DOCUMENTS

| 8,812,519 B1 * | 8/2014 | Bent ..................... G06F 16/532 |
| | | 707/748 |
| 10,002,415 B2 * | 6/2018 | Shen .................... G06N 3/0454 |
| 2006/0018522 A1 | 1/2006 | Sunzeri |
| 2019/0005313 A1 * | 1/2019 | Vemulapalli ......... G06K 9/4628 |

OTHER PUBLICATIONS

Jekel et al ("Classifying Online Dating Profiles On Tinder Using Facenet Facial Embeddings", submitted to arxiv.org on Mar. 12, 2018 and available at https://arxiv.org/abs/1803.04347. downloaded on Nov. 19, 2020) (Year: 2018).*
Schroff et al, "FaceNet: A unified embedding for face recognition and clustering", 2015 IEEE Conference on Computer Vision and Pattern Recognition (CVPR), 2015, pp. 815-823, https://www.cv-foundation.org/openaccess/content_cvpr_2015/app/1A_089.pdf.
"Inverting Facial Recognition Models," Jan. 2019, Deep Learning (https://blog.floydhub.com/inverting-facial-recognition-models/, downloaded Oct. 19, 2020).

* cited by examiner

*Primary Examiner* — Leon Viet Q Nguyen
(74) *Attorney, Agent, or Firm* — Davis Malm & D'Agostine, P.C.; David J. Powsner

(57) ABSTRACT

A device, system, and method to enable the automatic search of personal profiles in the context of on-line dating that includes the ability to select personal profile images which a likelihood of being perceived as attractive to the person conducting the search. Additionally, by way of further non-limiting example, the device, system, and method is useful in applications such as automatically searching hundreds of actor or model headshots and selecting the ones the director/photographer will approve of for a particular photoshoot, film, or commercial.

8 Claims, 2 Drawing Sheets

|       |       |      |       |
|-------|-------|------|-------|
| Y1    | Y2    | .... | Yk    |
| Xn,1  | Xn,2  | .... | Xn,k  |
| ...   | ...   | .... | ...   |
| X3,1  | X3,2  | .... | X3,k  |
| X2,1  | X2,2  | .... | X2,k  |
| X1,1  | X1,2  | .... | X1,k  |

Fig. 3

METHODS AND SYSTEMS FOR AUTOMATED ATTRACTIVENESS PREDICTION

This application claims the benefit of priority of U.S. Patent Application Ser. No. 62/661,960, filed Apr. 24, 2018, entitled ATTRACTIVENESS DNA—A SYSTEM UTILIZING ARTIFICIAL INTELLIGENCE TO PREDICT THAT USER WILL FIND A SPECIFIC FACE ATTRACTIVE AND USER THAT KNOWLEDGE IN AN ON-LINE DATING SETTING, the teachings of which are incorporated herein by reference.

BACKGROUND OF THE INVENTION

The invention pertains to digital data processing and, more particularly, to analysis of facial images. The invention can be used, by way of non-limiting example, to facilitate online dating, talent searching, staffing and human resources, among other applications.

For centuries, humanity has tried to uncover what makes a face attractive, and while there are many theories (e.g. the Golden Ratio), ultimately, what a given person finds attractive remains deeply subjective. As a consequence of this and of shortcomings in the prior art, dating and other services typically defer when it comes to finding candidates attractive to a given user, instead, requiring the user to make that selection for him or herself from among tens or hundreds of candidate images.

Nonetheless, those prior art dating services tasked with automatically finding attractive candidates must resort to finding lookalikes. To that end, they rely on technology, e.g., like that disclosed in U.S. Patent 2006/0018522 A1. Unfortunately, searching for potential dates who are lookalikes of celebrities or others improves the seekers chances of finding someone they find attractive only slightly.

The invention seeks to improve on the foregoing by providing improved systems and methods for automatically finding images of candidates that are likely to be attractive to users, e.g., of a dating site, a talent search agency, or otherwise.

SUMMARY OF THE INVENTION

The foregoing are among the objects attained by the invention, which provides in some aspects computer-implemented methods of online dating that include displaying on a digital data device facial images of one or more candidates and assigning, based on user input to that device, an attractiveness rating of each person shown in those images. The method further includes training a model with the displayed images and the corresponding attractiveness ratings, and using the trained model to search facial images of one or more additional candidates likely to have a desirable attractiveness rating. Those that do can be displayed to the user for further feedback and/or to initiate communication (direct or indirect) between the user and one or more of those candidates.

Related aspects of the invention provide methods, e.g., as described above, in which the attractiveness rating is any of "dislike", "not sure", "like" and "strongly like", and in which a desirable attractiveness rating is any of "not sure", "like" or "strongly like".

Further related aspects of the invention provide methods, e.g., as described above, in which the step of displaying facial images of candidates predicted to be likely to have a desirable attractiveness includes displaying textual or other profile information regarding persons shown in those images.

Still further related aspects of the invention provide methods, e.g., as described above, comprising inputing candidate images and profiles, extracting image embeddings from each image and storing the embeddings in connection with each candidate's profile.

Yet still further related aspects of the invention provide methods, e.g., as described above, comprising displaying on the digital data device a test set of facial images; accepting feedback from the user regarding an attractiveness rating for the person shown in each such image; using the trained model to predict the attractiveness rating of each such person; and measuring an accuracy of the model by comparing the predicted attractiveness rating of each image with the attractiveness rating for that image input from the user.

Other related aspects of the invention provide methods, e.g., as described above, that include updating the model based on the comparison of the predicted attractiveness rating of each image with the user-input attractiveness rating for that image.

In other aspects, the invention provides methods, e.g., as described above, comprising winnowing from display to the user images of candidates who are not predicted to find the user attractive.

Still other aspects of the invention provide methods, e.g., as described above, comprising determining the attractiveness rating of the user to a candidate based on a model trained for that candidate.

The foregoing and other aspects of the invention are evident in the drawings and in the text that follows.

BRIEF DESCRIPTION OF THE DRAWINGS

A more complete understanding of the invention may be attained by reference to the drawings, in which:

FIG. 3 depicts a matrix of embeddings and attractiveness ratings used in training a model in connection with practice of the invention.

DETAILED DESCRIPTION OF THE ILLUSTRATED EMBODIMENT

Figure 1:
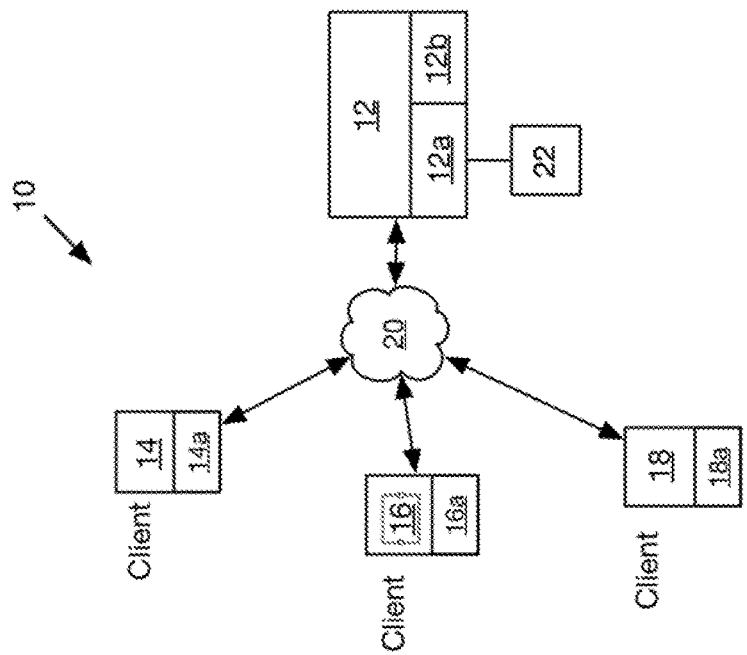
FIG. 1 depicts an environment in which the invention is practiced.

FIG. 1 depicts a digital data processing system 10 of the type in which the invention may be practiced. This includes a server digital data processor 12 that is coupled to client digital data processors 14, 16 and 18 via the Internet, a wide area network (WAN), metropolitan area network (MAN), local area network (LAN), telephone networks and/or a combination of these and other networks (wired, wireless, public, private or otherwise)—all designated here by the network element 20.

The illustrated client digital data processors 14-18 are conventional tablet computers, PDAs, mobile phones or other digital data apparatus (including, for example, desktop computers, workstations, minicomputers, and laptop computers) of the type that are commercially available in the marketplace and that are suitable for operation in the illustrated system as described herein and all as adapted in accord with the teachings hereof.

The digital data processors 14-18 each comprise central processing, memory, storage and input/output units and other constituent components (not shown) of the type conventional in the art that are configured to store and execute web or other software applications 14a-18a, respectively, for purposes of (i) presenting interactive user interfaces on the respective devices 14-18 in response to HTML or other codes received from server 12 via network 20, and (ii) responding to user input or otherwise for generating requests for those user interfaces and/or responses thereto, e.g., in the form of HTTP codes or otherwise, for transmissions to server 12 via network 20. In the illustrated embodiment those interactive user interfaces are driven by server 12 to display images of persons ("candidates") potentially attractive to the users of the respective devices 14-18, and to acquire feedback (e.g., in the form of "like" and "don't like" indicators or otherwise) from those users indicating whether, in fact, they find the persons depicted attractive.

In the illustrated embodiment, the web apps 14a-18a execute within web browsers of the type commercially available in the marketplace, though, in other embodiments, those apps may comprise stand-alone applications (regardless of whether web apps, mobile apps, desktop applications or otherwise) that operate independently of a browser or, at least, appear to do so from the perspective of the user. It will thus be appreciated that the term "web apps" is used for convenience and not limitation.

The central processing, memory, storage and input/output units of client digital data processors 14-18 may be supplemented by other elements of the type known in the art desirable or necessary to support applications 14a-18a, respectively, in accord with the teachings hereof, as well as to support other operations of the digital data processor 12. These can include, by way of non-limiting example, peripheral devices (such as keyboards and monitors), operating systems, and network interface cards and software, e.g., for supporting communications with server digital data processor 12 and other devices over network 20.

Although client digital data processors 14-18 are depicted and described in like manner here, it will be appreciated that this is for sake of convenience: in other embodiments, these devices may differ in architecture and operation from that shown and described here and/or from each other, all consistent with the teachings hereof.

Like client digital data processors 14-18, server digital data processor 12 is a digital data processing apparatus of the type commercially available in the marketplace suitable for operation in the illustrated system as described herein, as adapted in accord with the teachings hereof. Though the server 12 is typically implemented in a server-class computer, such as a minicomputer, it may also be implemented in a desktop computer, workstation, laptop computer, tablet computer, PDA or other suitable apparatus (again, as adapted in accord with the teachings hereof).

Server digital data processor 12, too, comprises central processing, memory, storage and input/output units and other constituent components (not shown) of the type conventional in the art that are configured in accord with the teachings hereof store and execute application 12a for generating and transmitting to clients 14-18 data and other codes defining and/or for use by web apps 14a-18a (e.g., whether browser-based, mobile apps, desktop apps or otherwise) and for accepting feedback returned by those devices 14-18 from the users thereof.

In the illustrated embodiment, the application 12a inter alia generates data and other codes in order to drive user interfaces 14a-18a to present images of candidates potentially attractive to the users of the respective devices 14-18 and to accept feedback (e.g., in the form of "like" and "don't like" indicators or otherwise) from those users as to whether and the extent to which they, in fact, find the persons shown in those images attractive. To this end, and as further discussed below, application 12a is coupled to (i) models 12b that model the attractiveness preferences of each user of devices 14-18 vis-à-vis encodings of candidate facial images, and (ii) data set 22 of candidate facial images, profiles and other data.

Although only a single server digital data processor 12 is depicted and described here, it will be appreciated that other embodiments may have greater or fewer numbers of these devices. Those other servers may differ in architecture and operation from that shown and described here and/or from each other, all consistent with the teachings hereof. Still further, although server 12 of the illustrated embodiment is depicted as being remotely disposed from the client digital data processors 14-18, in other embodiments, one or more of the client devices may be co-housed with the server. In yet still other embodiments, the functionality ascribed here to server 12 may be executed by the web apps 14a-18a, e.g., as where those apps are stand-alone and capable of operating entirely or substantially without access to a server.

Likewise, although only a single model 12b is shown in the drawing, in practice one such model is provided for each user of devices 14-18. Each such model can include or be coupled with an artificial intelligence engine, not shown, that can be disposed and executed locally to application 12a, though, in other embodiments the model 12b (and/or accompanying engine) can be disposed and execute remotely from application 12a—e.g., on a further network-coupled server or other digital data device.

Likewise, in the illustrated embodiment, the data set 22 (which can include a native database management system) is disposed and executed locally to application device 12, though, in other embodiments data set 22 can be disposed and execute remotely from application 12a—again, for example, on a further network-coupled server or other digital data device.

In the illustrated embodiment, the application 12a implements a social relationship service—for example, an online dating service—across a distributed network comprised of client devices 14-18. In other embodiments, the application 12a may implement other services, e.g., for talent searching, among other applications and it may do so without use of a distributed network.

Figure 2:
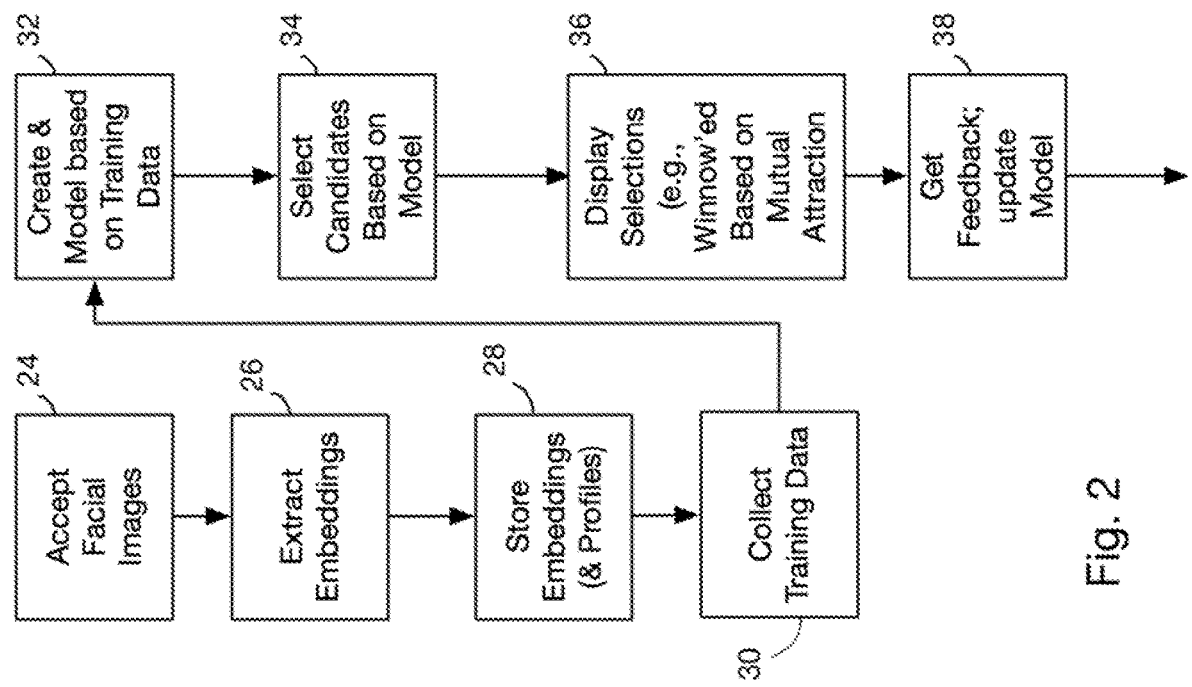
FIG. 2 depicts a method according to the invention.

Operation of the application 12a as a social relationship service (e.g., an online dating service) is depicted in FIG. 2.

In step 24, application 12a accepts facial images of users of apps 14a-18a. These can be uploaded by those users when they register with the social relationship service or otherwise from image directories on devices 14-18, acquired using on-board cameras at user request and transmitted via user interfaces, e.g., generated by application 12a, transmitted to, and presented by apps 14a-18a, all per convention in the art as adapted in accord with the teachings hereof. The images can be in jpeg, tiff, png, pdf or other formats known in the art, proprietary or otherwise.

In step 26, application 12a extracts an embedding of each facial image accepted in step 24. As will be appreciated by those skilled in the art, an embedding is a vector representation of measurements of features of a face in n-dimensional space, where each element of the vector has a value between zero and one and where visually similar faces are "close" to each other in that n-dimensional space. In the illustrated embodiment, the embeddings are vector representations in 128-dimensional space, although, other embodiments may vary in this regard.

Generation of such embeddings from user facial images is within the ken of those skilled in the art as evidence by the literature, e.g., at "FaceNet: A unified embedding for face recognition and clustering," Schroff et al, 2015 IEEE Conference on Computer Vision and Pattern Recognition (CVPR), 2015, pp: 815-823, and (see https://www.cv-foundation.org/openaccess/content_cvpr_2015/app/1A_089.pdf), the teachings of both of which are incorporated by reference herein, and as provided for in facial recognition projects available in open source (e.g., OpenFace, at https://cmusatyalab.github.io/openface/), commercially through published API's and otherwise.

In step 28, application 12a stores to data set 22 the embedding of each facial image extracted in step 26. In the illustrated embodiment, embeddings for each user are represented by a vector X—x1, x2 ... xn where n is the number of dimensions discussed above. This is preferably in connection with storage of each user's image and textual profile (e.g., biographic data, dating preferences, etc.) to that same (or a related) data set or otherwise, e.g., thereby facilitating the retrieval of those profiles and/or images in connection with those embeddings for processing and/or presentation to users of apps 14a-18a in later steps of the illustrated process. Storage and retrieval of such embeddings and/or profiles in data sets, such as data set 22, may be accomplished in the conventional manner of the art as adapted in accord with the teachings hereof.

In step 30, application 12a collects data from each user regarding his/her likes and dislikes. To that end, the application 12a generates and transmits to a respective user's client device 14-18 data and/or other codes representing images from data set 22 of a first subset of candidates (e.g., other "users" of the social relationship service) for display to that user via user interfaces in apps 14a-18a, respectively. The retrieval of those images, as well as their generation, transmission and display via such user interfaces, may be accomplished per convention in the art as adapted in accord with the teachings hereof. That first subset, which can be chosen randomly, based on user and candidate profiles or otherwise, is selected so as to produce an model 12b that is a reasonably reliable predictor of the user's likes/dislikes vis-a-vis the facial images in the data set 22—though, as discussed below, the model training can continue until desired thresholds of prediction are met.

For each such image displayed in step 30, the application 12a accepts feedback returned by the user interface of app 14a-18a from the user to which it was displayed indicating whether and, in some embodiments, the extent to which, he/she finds the person depicted in the image attractive. This can be done via transmission from the app 14a-18a to the application 12a of http and/or other codes associated with "dislike," "like," "strongly like," "don't know" or other controls or inputs presented by the respective user interface and utilized by the user to reflect how attractive he/she finds the person in the image. The collection and return of such user feedback in response to images may be accomplished per convention in the art as adapted in accord with the teachings hereof.

For each user from which such data is collected in step 30, the application 12a stores to data set 22 or another data set associated therewith a vector of ratings yK, representing a degree to which that user rates as attractive the candidate K depicted in the image presented in step 28. If the user liked (or strongly liked) the candidate, the value of yK for that candidate is 1; if the rating user disliked the candidate, that value is 0. If the user indicated that he/she did "not know" whether he/she liked the candidate, no rating yK is stored to the data set for the candidate (i.e., as if the candidate's image had not been presented to the user at all). Rating values may be more complex, such as rating from 1 to 10 for example, but for simplicity sake 0 and 1 values are used in this description.

The reason some embodiments have two "like" ratings—i.e., "like" and "strongly like"—is that the inventor has discovered that STRONGLY LIKE cannot be relied upon because it is a relatively rare event. To take a concrete example: if, for specific user, a STRONGLY LIKE rating is triggered by 1 photo out of 200, then to collect only 20 STRONGLY LIKE ratings for model training for that user will need to rate 20×200=4,000 photos. Assuming it takes 2 sec to rate each photo, that user will spend 2×4,000=8,000 sec or 2.2 hours on the training mode, which makes this impractical since most users do not have that kind of patience.

The inventor has found that the solution was to ask the user to provide both LIKE and STRONGLY LIKE ratings. Although these numbers vary from user to user but on average users give LIKE rating to every 20th photo presented to them. To collect 20 LIKE ratings we need user to rate 20×20=400 photos. Assuming it takes 2 sec to rate each photo user will spend 2×400=800 sec or 22 min which is a lot more practical.

After the initial training mode is over and user is provided with recommendations, he/she continues to provide ratings on provided recommendations. When a sufficient number of STRONGLY LIKE ratings are collected for a given user's model, LIKE ratings are discarded and only DISLIKE and STRONGLY LIKE ratings are retained to retrain that user's model. This significantly increases the accuracy and quality of recommendations.

To summarize, the use of four ratings ("like", "strongly like", "dislike" and "don't know") allows an embodiment to strike a reasonable balance between relatively short initial training and quality of recommendations. Thus, some embodiments can provide valuable recommendations as soon as 20 min. after a user begins training step 30 providing as little as 40 input data points for training (e.g., 20 DISLIKEs and 20 LIKEs). Although other embodiments may differ, in the illustrated embodiment, the application 12a stores the ratings yK formed from the feedback provided by each user in step 30 alongside the vectors x1, x2 ... xn of embeddings for the facial images on which those ratings were based. That is, it stores those ratings alongside the embeddings in a matrix M, as shown in FIG. 3, where the first row contains embeddings X1 ... Xn and rating Y1 for candidate 1 on which user feedback was received in step 30; the second row, for candidate 2; and, the final row, for candidate k.

Referring back to FIG. 2, in step 32, the application 12a creates model 12b, referred to here as an "IMAmodel," for each user using matrix M generated for that user from the data collected for him/her in step 30. That model is generated utilizing a neural network, support vector machine, k-nearest neighbor or other supervised learning classification technique of the type known in the art as adapted in accord with the teachings hereof.

Some embodiments generate the model utilizing support vector machines that have Gaussian kernels. The inventor has discovered that such machines are capable of generating models with suitable acceleration rates and, yet, are faster to train and/or require fewer resources than machines that generate models using other supervised learning classification techniques. As those skilled in the art will appreciate, those other learning classification techniques (e.g., neural networks) may result in models that are more accurate; however, such accuracy is less important than acceleration rates in dating apps or other such applications of the invention.

The term acceleration rate (AR) may be attained by reference to the formula below and the discussion that follows.

$$AR = N\_likes\_predicted / N\_likes\_random,$$

where,

N_likes_predicted is percentage of LIKE (or STRONGLY LIKE) ratings user gives when presented with model predictions.

N_likes_random is percentage of LIKE (or STRONGLY LIKE) ratings user gives when presented with random images.

To illustrate by example. assume that User 1 when presented with random images finds (on average) 1 in 20 images attractive. We will say that User1's likeability rating is 5%.

Now, assume that a model after training step 30 suggests to the User 1 ten images and out of those ten User 1 likes eight. On one hand, the accuracy of prediction is 80%. On the other hand, if we take 80% and divide it by 5%, we have a factor of 16. We refer to that as the model's acceleration factor. A model with an acceleration factor of 16 is capable of predicting images of users will find attractive 16-times faster. This is a significant advantage for a dating app, by way of example. Returning to FIG. 2, for each user of devices 14-18, application 12*a* repeats execution of steps 30 and 32 until the respective IMAmodel 12*b* for that user reaches a satisfactory accuracy threshold—e.g., until the model's predictions of the user's likes and/or dislikes match those discerned from data collected in step 30 to at least 60% accuracy, though, in other embodiments, different thresholds of accuracy may be employed.

In step 34, the application 12*a* uses the model generated for a user to predict which candidates whose facial images stored in data set 22 the user is likely to find attractive. To that end, the application 12*a* can retrieve facial embeddings of a second subset of facial images in the data set 22 and, for each of those embeddings, use the IMAmodel for the user to predict whether he/she is likely to find the person depicted in the image attractive. Such prediction is within the ken of those skilled in the art in view of the teachings hereof.

Although the first and second aforementioned subsets may overlap, in the illustrated embodiment, the second subset of facial images comprises those in data set 22 not included in the first subset. The second subset can be further narrowed to include only those candidates whose biographical profiles match the dating preferences specified by the user in his/her respective profile or otherwise.

In step 36, the application 12*a* of some embodiments generates and transmits to the respective user's client device 14-18 data and/or other codes representing each image predicted in step 34 likely to be attractive to the user of that device for display via the respective user interface 14*a*-18*a*. In other embodiments, the application 12*a* does not generate and transmit every image to which the user is likely to be attracted. Instead, it limits this to images of candidates who, themselves, are likely to find the user attractive—as determined by applying the users' embedding against each such candidate's respective IMAmodel 12*b* in accord with the same selection logic as discussed above in connection with step 34 (and as further winnowed by any profile-based restrictions the candidate may have).

Just as in the training phase, for each such image displayed in step 36, the application 12*a* in step 38 accepts feedback returned by the user interface of app 14*a*-18*a* indicating whether and, in some embodiments, the extent to which, the user finds the person depicted in the image attractive—and, indeed, whether the user wishes to date or otherwise establish communications with the candidate. Regardless, that feedback can be used to expand matrix M for the user and to further hone the IMAmodel generated for him/her using N-fold cross validation or other model validation techniques of the type known in the art as adapted in accord with the teachings hereof.

Discussion

One reason users of dating services include pictures with their profiles is so that other users can gauge their relative attractiveness and other physical attributes, and subsequently make a connection. However, relative attractiveness or physical attributes are highly subjective and difficult to search for, resulting in users having to manually review the pictures associated with the user profiles. Additionally, searching for lookalikes improves their chances of finding someone they like only slightly.

It is worthy to note that while there may be correlation between the notions of similarity (or lookalikeness) and attractiveness there is a distinction, concretely:

If a user is attracted to Candidate 1 and Candidate 2 looks similar to Candidate 1, it is true that there is a higher probability that the user will find Candidate 2 attractive, as well. However, it is not guaranteed. At the same time, the user may be attracted to Candidate 2 even if he/she does not look similar to Candidate 1.

Currently, there are many on-line dating and matchmaking services. Some of these include Match.com, Badoo, and Tinder. These services can be accessed online through various devices, such as laptops, smartphones, or tablets, and it is in this communication network that the illustrated embodiment can also be applied.

Most of these services allow users to create personal profiles about themselves that are made available to third parties. As part of the profiles, users also include pictures of themselves. A person's image may be an important factor in determining whether a profiled individual is a suitable match. These pictures are generally digitized images and usually include the person's face.

A common part of the online dating experience is the situation where the user is presented with photographs of candidates and is asked to indicate whether the user "likes" or "dislikes" the person—i.e., whether he/she finds that person attractive. When the user "likes" a candidate (i.e., finds him/her attractive) that candidate is typically notified and may respond back expressing interest or not.

This manual process of rating (or "liking") images is a major limiting factor of on-line dating systems. It is time-consuming and nearly physically impossible to search through the large number of potential matches out there. For example, there are millions of users in a city like New York—never mind the country or the world. The number of photos a user can see and rate is a tiny fraction of the potential matches out there.

It is also true that if the user does not want to compromise, if the user is searching for his/her "one and only" ideal match, that search may take a very long time. Even worse, after a long search when the user finally finds a candidate he/she really finds attractive, the probability that the candidate will find the user attractive, mathematically speaking, is small.

Here is how the embodiment illustrated here deals with these problems:

When a user rates photos of candidate dating partners, e.g., via a user interface executing on a respective client digital data device 14-18, the AI-based application 12a, e.g., executing on the server digital data device 12, receives those photos with "like" and "dislike" (or other) attractiveness ratings and, thereby, learns the user's preferences. Afterwards, with increasing accuracy, the application 12a is capable of taking any photograph containing a face and predicting whether or not that user will find it attractive.

Additionally, beyond just showing profiles of candidates it predicts the user will find attractive, the application 12a of some embodiments has a "mutual match" capability. As such, it identifies candidates that it predicts would find the user attractive (e.g., by using the candidates' respective model). The application 12a can, then, rank or filter candidates that it predicts the user will find attractive in accord with those that it predicts will find the user attractive. By presenting those candidates to the user, e.g., via a UI on the user's digital data device, he or she gets results that have a high chance of a mutual attraction.

EXAMPLES OF USE

Consider the following scenarios:

Example 1. Finding Potential Match in Automated Fashion

1. Paul is registered with application 12a and is interested in women. During the last 2 months, he rated many photos of female users and, as a result, his IMAmodel can now predict with sufficient accuracy whether Paul will find particular female face attractive or not.
2. Mary just registered with application 12a and now has her photo and vector X representing her facial embeddings.
3. Application 12a can feed as an input Mary's vector X to Paul's IMAmodel 12b and predict whether or not Paul will find Mary attractive in a fully automated fashion.
4. If that model predicts that Paul will find Mary's face attractive, application 12a generates data and/or codes for the user interface suggesting that Paul look at Mary's profile.

Example 2. Mutual Match

In addition to dramatically improving the chances of users finding their ideal match even in database containing millions of users application 12a can use the IMAmodel training and prediction capabilities to ensure that it finds people who are highly likely to find each other attractive. Consider the following example:
1. Once Paul's IMAmodel 12b is trained, application 12a is capable of predicting what Paul will find attractive automatically.
2. Also, with Sarah's IMAmodel 12b trained, application 12a is capable of predicting what Sarah will find attractive automatically.
3. At the same time, with Maria's IMAmodel trained, application 12a is capable of predicting what Maria will find attractive automatically.
4. Assume that Paul's IMAmodel 12b predicts that Paul will find both Sarah and Maria attractive.
5. Further, assume that Sarah's IMAmodel 12b predicts that Sarah will not find Paul attractive and Maria's IMAmodel predicts that Maria will find Paul attractive.
6. When choosing which profiles to suggest to Paul Maria's profile will get a higher priority because Paul and Maria are a mutual match.

Described above are embodiments achieving the desired objects. It will be appreciated that other embodiments, incorporating changes to those shown here, fall within the scope of the invention. Thus, for example, although the illustrated embodiments are described in connection with online dating, the teachings hereof are applicable to talent searching, staffing and human resources, and other applications, in which attractiveness (or lack thereof) can be a facilitating factor.

In view of the foregoing, what is claimed is:
1. A computer-implemented method of online dating comprising the steps of:
  A. displaying to a user on a digital data device only images of faces of one or more candidates from a first set;
  B. assigning an attractiveness rating to each said candidate based on input from the user on the digital data device with respect to the image of that candidate displayed in step (A), wherein each of an attractiveness rating of "like", "strongly like", "don't know" or "don't like" is assigned to at least one candidate;
  C. extracting embeddings for faces in the images displayed in step (A), where each embedding is a n-dimensional vector characterizing the respective face from which it is extracted;
  D. training a model that is coupled to an artificial intelligence engine for the user based on (i) the n-dimensional vector embeddings extracted in step (C) for the faces in the images displayed in step (A), and (ii) respective numerical values associated with the corresponding attractiveness ratings assigned in step (B), wherein those attractiveness ratings include "like", "strongly like", "don't know" or "don't like";
  E. retrieving images of faces of one or more candidates from a second set, extracting an embedding of each such face, where each such embedding is a n-dimensional vector characterizing the respective face from which it is extracted, and
    using the model that is coupled with the artificial intelligence engine to predict from the embeddings of the respective candidate's faces which of the candidates in the second set are likely to have a desirable attractiveness rating to the user, where the desirable attractiveness rating is any of "like" and "strongly like"; and
  F. displaying to the user on a digital data device images of faces of one or more candidates that are predicted in step (E) to be likely to have the desirable attractiveness rating
  G. inputing, from the user, an attractiveness rating for a said image of a face of a said candidate whose image is displayed in step (E); and
  H. comparing the attractiveness rating input in step (G) with an attractiveness rating predicted with the model for the user for the image in connection with which that rating was input.

2. The method of claim 1, in which wherein step (D) comprises training the model only with those faces in the images displayed in step (A) assigned a "strongly like" attractiveness rating.

3. The method of claim 1, in which the first set includes candidates selected based on user and/or candidate profiles.

4. The method of claim 1, in which the second set includes only candidates selected based on their profiles.

5. The method of claim 1, wherein step (D) includes generating the model using any of a neural network, support vector machine, k-nearest neighbor or other supervised learning classification technique.

6. The method of claim 1, comprising updating the model for the user based on the comparison in step (H).

7. The method of claim 1 comprising
    displaying to the user on the digital data device images of faces of one or more candidates that are predicted to be likely to have the desirable attractiveness rating.

8. The method of claim 1, comprising
    executing steps A-D with respect to one or more candidates to train respective models, and
    wherein step (F) includes displaying to the user on a digital data device images of faces of only those candidates who are predicted to find the user attractive.

\* \* \* \* \*